(12) United States Patent
Okada et al.

(10) Patent No.: US 10,069,998 B2
(45) Date of Patent: Sep. 4, 2018

(54) IMAGE FORMING APPARATUS CONFIGURED FOR FORMING A MEMO IMAGE IN A DESIGNATED REGION OF A SHEET SUPPLIED FROM THE PAPER SUPPLY UNIT

(71) Applicants: KABUSHIKI KAISHA TOSHIBA, Tokyo (JP); TOSHIBA TEC KABUSHIKI KAISHA, Tokyo (JP)

(72) Inventors: Kazuya Okada, Mishima Shizuoka (JP); Tsukasa Tanda, Yokohama Kanagawa (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/422,501

(22) Filed: Feb. 2, 2017

(65) Prior Publication Data

US 2017/0230530 A1 Aug. 10, 2017

(30) Foreign Application Priority Data

Feb. 5, 2016 (JP) ................. 2016-020374

(51) Int. Cl.
*G06K 15/00* (2006.01)
*H04N 1/23* (2006.01)
*H04N 1/00* (2006.01)

(52) U.S. Cl.
CPC ....... *H04N 1/2338* (2013.01); *H04N 1/00724* (2013.01); *H04N 1/00737* (2013.01); *H04N 1/00779* (2013.01); *H04N 1/2323* (2013.01); *H04N 1/2392* (2013.01); *H04N 2201/0094* (2013.01)

(58) Field of Classification Search
USPC ........................... 358/1.1–3.29, 538
See application file for complete search history.

(56) References Cited

U.S. PATENT DOCUMENTS

| 4,594,302 A | * | 6/1986 | Kubo | ............... G03G 13/01 430/45.31 |
| 6,396,598 B1 | * | 5/2002 | Kashiwagi | ........ G06F 3/04883 358/474 |

(Continued)

FOREIGN PATENT DOCUMENTS

| JP | 2002-232681 | | 8/2002 | |
| JP | 2009-089294 | * | 4/2009 | ............. H04N 1/387 |

*Primary Examiner* — Marcellus Augustin (74) *Attorney, Agent, or Firm* — Patterson & Sheridan, LLP (57) ABSTRACT

An image forming apparatus according to an embodiment includes a paper supply unit. An image forming unit forms an image on paper supplied from the paper supply unit. A reading unit generates image information by reading an original document, the generated image information corresponding to the original document. An input unit receives input designation of a memo region in the generated image information. A control unit determines a color of the original document based on the generated image information. The image forming unit forms a memo image in the designated memo region on the paper supplied from the paper supply unit with a color different from the determined color of the original document.

14 Claims, 11 Drawing Sheets

(56) References Cited

U.S. PATENT DOCUMENTS

| | | | |
|---|---|---|---|
| 2007/0115256 A1* | 5/2007 | Lee | G09G 5/14 |
| | | | 345/156 |
| 2008/0069473 A1* | 3/2008 | Tojo | G06K 9/00973 |
| | | | 382/276 |
| 2009/0087017 A1* | 4/2009 | Onishi | G06F 17/30011 |
| | | | 382/100 |
| 2010/0122309 A1* | 5/2010 | Kawakami | H04N 7/17318 |
| | | | 725/116 |
| 2017/0155790 A1* | 6/2017 | Tanaka | H04N 1/2166 |

* cited by examiner

AAAAAAAAAAAAAAAAAAAAAAAAAAAAAA
AAAAAAAAAAAAAAAAAAAAAAAAAAAAAA
AAAAAAAAAAAAAAAAAAAAAAAAAAAAAA
AAAAAAAAAAAAAAAAAAAAAAAAAAAAAA
AAAAAAAA

BBBBBBBBBBBBBBBBBBBBBBBBBBBBBB
BBBBBBBBBBBBBBBBBBBBBBBBBBBBBB
BBBBBBBBBBBBBBBBBBBBBBBBBBBBBB
BBBBBBBBBBBBBBBBBBBBBBBBBBBBBB
BBBBBBBBBBBBBBBBBBBBBBBBBBBBBB
BBBBBBBB

FIG. 4

| START POINT | END POINT |
|---|---|
| (X1:Y1) | (X2:Y2) |
| (X3:Y3) | (X4:Y4) |

AAAAAAAAAAAAAAAAAAAAAAAAAAAAA
AAAAAAAAAAAAAAAAAAAAAAAAAAAAA
AAAAAAAAAAAAAAAAAAAAAAAAAAAAA
AAAAAAAAAAAAAAAAAAAAAAAAAAAAA
AAAAAAAAA

BBBBBBBBBBBBBBBBBBBBBBBBBBBBB
BBBBBBBBBBBBBBBBBBBBBBBBBBBBB
BBBBBBBBBBBBBBBBBBBBBBBBBBBBB
BBBBBBBBBBBBBBBBBBBBBBBBBBBBB
BBBBBBBBBBBBBBBBBBBBBBBBBBBBB
BBBBBBBB

K~ ( END )

*FIG. 7*

AAAAAAAAAAAAAAAAAAAAAAAAAAAAA
AAAAAAAAAAAAAAAAAAAAAAAAAAAAA
AAAAAAAAAAAAAAAAAAAAAAAAAAAA
AAAAAAAAAAAAAAAAAAAAAAAAAAAA
AAAAAAAAA

M~

BBBBBBBBBBBBBBBBBBBBBBBBBBBBB
BBBBBBBBBBBBBBBBBBBBBBBBBBBBB
BBBBBBBBBBBBBBBBBBBBBBBBBBBBB
BBBBBBBBBBBBBBBBBBBBBBBBBBBB
BBBBBBBBBBBBBBBBBBBBBBBBBBBB
BBBBBBBB

K~ END

FIG. 8

AAAAAAAAAAAAAAAAAAAAAAAAAAAA
AAAAAAAAAAAAAAAAAAAAAAAAAAAA
AAAAAAAAAAAAAAAAAAAAAAAAAAAA
AAAAAAAAAAAAAAAAAAAAAAAAAAAA
AAAAAAAA

M~  CCCCCCCCCC
CCCCCCCCC

BBBBBBBBBBBBBBBBBBBBBBBBBBBB
BBBBBBBBBBBBBBBBBBBBBBBBBBBB
BBBBBBBBBBBBBBBBBBBBBBBBBBBB
BBBBBBBBBBBBBBBBBBBBBBBBBBBB
BBBBBBBBBBBBBBBBBBBBBBBBBBBB
BBBBBBBB

K~  END

IMAGE FORMING APPARATUS CONFIGURED FOR FORMING A MEMO IMAGE IN A DESIGNATED REGION OF A SHEET SUPPLIED FROM THE PAPER SUPPLY UNIT

CROSS-REFERENCE TO RELATED APPLICATION

This application is based upon and claims the benefit of priority from Japanese Patent Application No. 2016-020374, filed Feb. 5, 2016, the entire contents of which are incorporated herein by reference.

FIELD

An embodiment described herein relates generally to an image forming apparatus.

BACKGROUND

In an image forming apparatus, when copying an original document, a memo region may be added. However, when creating the memo region, in many cases, the memo region is provided by reducing the size of the image to be formed on the paper. For this reason, the size of the image to be formed on the paper becomes small, and thus the image is not easily visible. In addition, various types of paper may be used for printing, and in particular, there are an increasing number of cases where color paper is used for printing instead of white paper. When a memo region is formed on the color paper, since the color paper is colored, the color paper may not be suitable for the memo region.

DETAILED DESCRIPTION

An exemplary embodiment described herein provides an image forming apparatus that creates an easily visible memo region when printing.

In general, according to one embodiment, an image forming apparatus includes a paper supply unit. An image forming unit forms an image on the paper supplied from the paper supply unit. A reading unit generates image information by reading an original document, the generated image information corresponding to the original document. An input unit receives input designation of a memo region in the generated image information. A control unit determines a color of the original document based on the generated image information. The image forming unit forms a memo image in the designated memo region on the paper supplied from the paper supply unit with a color different from the determined color of the original document.

Hereinafter, an exemplary embodiment will be described with reference to the accompanying drawings. In the present embodiment, multi-function peripherals (MFP) will be described as an example of an image forming apparatus.

Figure 1:
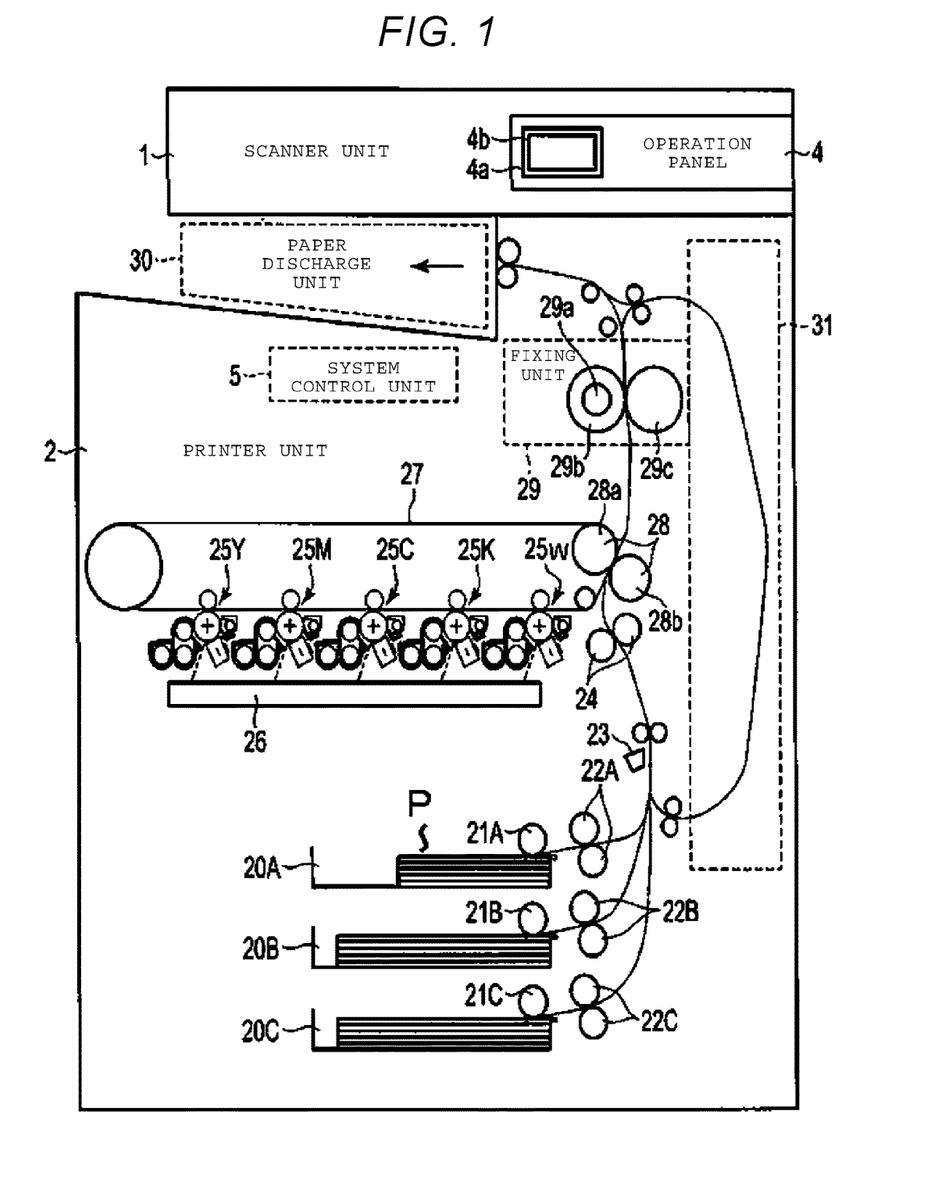
FIG. 1 is a sectional view schematically illustrating an image forming apparatus according the present embodiment.

The present embodiment will be described with reference to FIGS. 1 to 12. FIG. 1 is a sectional view schematically illustrating a configuration example of an MFP 100 according to an embodiment. As illustrated in FIG. 1, the MFP 100 includes a scanner unit 1, a printer unit 2 (an image forming unit), an operation panel 4 (input unit), and a system control unit 5.

Figure 3:
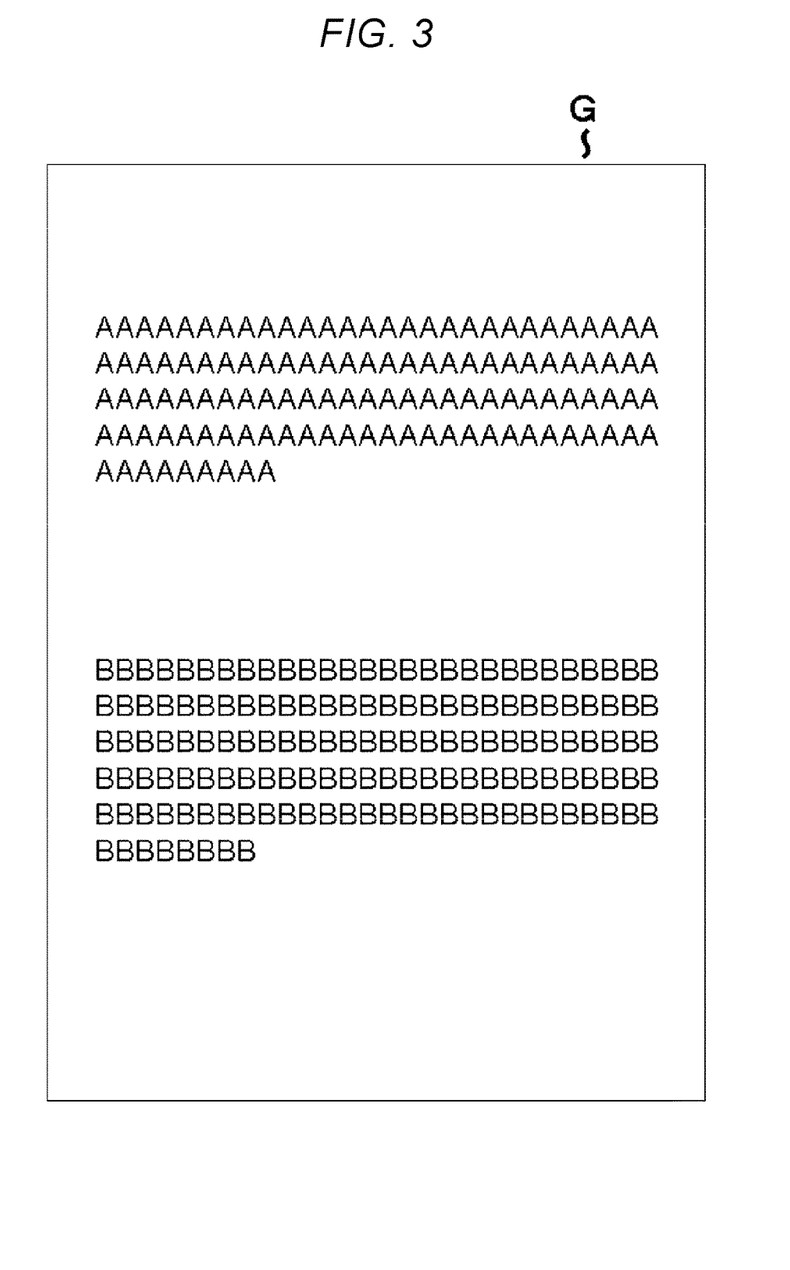
FIG. 3 is a diagram of an original document.

In the present embodiment, it is assumed that original document paper G illustrated in FIG. 3 is placed on the scanner unit 1. Characters are printed on the original document paper G, and the original document paper G has a color such as, for example, pale yellow.

The scanner unit 1 is, for example, a device that is provided on the upper side of the main body of the MFP 100, and that reads an image of the original document and generates image data based on the read image. The scanner unit 1 has a known configuration, and includes, for example, a CCD line sensor or the like that converts the image of the original document on the reading surface into the image data. The scanner unit 1 may scan the original document placed on a document reading surface (not illustrated), and may be one that reads the image of the original document transported by an auto document feeder (ADF). The scanner unit 1 is controlled by the system control unit 5.

The printer unit 2 forms an image on paper P as a recording medium. In the present embodiment, the printer unit 2 is an electrophotographic image forming unit. In the case of a color image, the printer unit 2 forms an image using a plurality of types (for example, five types of yellow (Y), cyan (C), magenta (M), black (K), and white (H)) of toner. The details for generating the image by the printer unit 2 will be described later.

In the configuration example illustrated in FIG. 1, the printer unit 2 includes paper supply cassettes 20 (20A, 20B, 20C) as a paper supply unit. For example, the paper supply cassettes 20A, 20B, and 20C are removably inserted into the bottom side of the main body of the MFP 100. Each of the paper supply cassettes 20A, 20B, and 20C stores the paper P of the type (for example, size, and paper quality) that is set for the corresponding cassette. Each of the paper supply cassettes 20A, 20B, and 20C may be set for the corresponding sizes after the paper P of, for example, different sizes is stored in the respective paper supply cassettes 20A, 20B, and 20C. A paper supply unit sensor is provided in each of the paper supply cassettes 20A, 20B, and 20C. The paper supply unit sensor detects the storage quantity of the paper stored in each of the paper supply cassettes 20A, 20B, and 20C. The paper supply unit sensor is, for example, an infrared sensor. A mechanical sensor also may be used as the paper supply unit sensor by using a micro switch. The paper supply unit sensor transmits the detection result to the system control unit 5 to be described later. The printer unit 2 may include a manual feed tray (not illustrated) as another paper supply unit.

The setting information of the paper P in each of the paper supply cassettes 20A, 20B, and 20C is stored in a nonvolatile memory. The printer unit 2 selects the appropriate paper supply cassette that stores the paper P to be used in the printing process according to the setting information. The printer unit 2 prints the image on the paper P that is supplied from the selected paper supply cassette. When the printer unit 2 includes a manual feed tray, the size of the paper P that is set in the manual feed tray may be input from the operation panel 4, and the input size of the paper P may be stored in the nonvolatile memory described above. The nonvolatile memory is hard disk drive (HDD) 55 to be described later. It is assumed that the paper P which is set in the paper supply cassette 20A has the same color as the color of the original document paper G.

In the following description, the paper is transported from the paper supply unit 20 to a paper discharge unit 30. The paper supply unit 20 side is referred to as the upstream side in the paper transport direction, and the paper discharge unit 30 side is referred to as the downstream side in the paper transport direction.

Transport rollers 22 illustrated in FIG. 1 are arranged along the paper transport path in the printer unit 2 to transport the paper P. The transport rollers 22 are driven by a motor (not illustrated). The transport rollers 22 transport the paper P that is supplied from the corresponding paper supply cassette 20A, 20B, or 20C by a pick-up roller 21A, 21B, or 21C, to registration rollers 24 that are arranged at the upstream side of a transfer unit 28 (described later). The registration rollers 24 transport the paper P to the transfer position so that an image is transferred to the paper P from an intermediate transfer belt 27 (described later).

The details of image formation will be described below. Image forming units 25, an exposure unit 26, the intermediate transfer belt 27, and the transfer unit 28 illustrated in FIG. 1 function as an image forming device for forming an image. The image forming units 25 form an image to be transferred to the paper. In the example illustrated in FIG. 1, a color image is generated. That is, the image forming unit 25Y forms an image corresponding to a yellow color that is obtained by color separation of the original document image, with yellow toner. In the same manner, the image forming unit 25M forms an image corresponding to a magenta color with magenta toner, and the image forming unit 25C forms an image corresponding to a cyan color with cyan toner. In the same manner, the image forming unit 25K forms an image corresponding to a black color with black toner, and the image forming unit 25W forms an image corresponding to a white color with white toner. Each of the image forming units 25Y, 25M, 25C, 25K, and 25W transfers the toner image of each color by superimposing the toner image on the intermediate transfer belt 27. Each of the image forming units 25Y, 25M, 25C, 25K, and 25W is configured with, for example, a developing unit including a photosensitive drum, an electrostatic charger, and toner and a discharging unit.

The electrophotographic image formation will be described in detail. Each of the image forming units 25Y, 25M, 25C, 25K, and 25W respectively includes sensors such as a potential sensor and a density sensor (not illustrated). The potential sensor detects the surface potential of the photosensitive drum included in each of the image forming units. In each of the image forming units 25Y, 25M, 25C, 25K, and 25W, the electrostatic charger charges the surface of the photosensitive drum before the photosensitive drum is exposed by the exposure unit 26 (described later). The system control unit 5 can change a charge condition by the electrostatic charger. The potential sensor detects the surface potential of the photosensitive drum of which the surface is charged by the electrostatic charger. The density sensor detects the density of the toner image that is transferred on the intermediate transfer belt 27 to be described later. The density sensor may detect the density of the toner image formed on the photosensitive drum.

The exposure unit 26 forms an electrostatic latent image of the original document image that is obtained from the scanner unit 1 by a laser beam, on the charged photosensitive drum of each of the image forming units 25Y, 25M, 25C, 25K, and 25W described above. The electrostatic latent image that is formed on each photosensitive drum is an image to be developed with toner of each color. In other words, the exposure unit radiates each photosensitive drum with a laser beam corresponding to each image forming unit to be controlled according to the image data, via an optical system such as a polygon mirror. The exposure unit 26 controls the power of the laser beam according to a control signal from the system control unit 5. The exposure unit 26 also controls the modulation amount or the like of the pulse width for controlling the emission of the laser beam according to the control signal from the system control unit 5.

As described above, each of the image forming units 25Y, 25M, 25C, 25K, and 25W develops the electrostatic latent image formed on each photosensitive drum with toner of each color by the developing unit. Each of the image forming units 25Y, 25M, 25C, 25K, and 25W forms a toner image as a visible image on the photosensitive drum. The intermediate transfer belt 27 is an intermediate transfer body. When forming the image, each of the image forming units 25Y, 25M, 25C, 25K, and 25W transfers (primarily transfers) the toner image from the photosensitive drum onto the intermediate transfer belt 27. Specifically, each of the image forming units 25Y, 25M, 25C, 25K, and 25W applies transfer bias to the toner image at the primary transfer position (for example, the portion at which the photosensitive drum and the transfer belt are in contact with each other). Each of the image forming units 25Y, 25M, 25C, 25K, and 25W controls the transfer bias by transfer current. The toner image on each photosensitive drum is transferred to the intermediate transfer belt 27 at each primary transfer position by the transfer bias. The system control unit 5 controls the transfer current that is used in the primary transfer processing by each of the image forming units.

The transfer unit 28 includes a support roller 28a and a secondary transfer roller 28b that are provided along the transport path of the paper P, and transfers the toner image on the intermediate transfer belt 27 to the paper P that is transported by the registration rollers 24 according to the transfer timing, at the secondary transfer position. The secondary transfer position is a position at which the support roller 28a and the secondary transfer roller 28b are opposite to each other so as to interpose the intermediate transfer belt 27. The transfer unit 28 applies the transfer bias to the belt 27 at the secondary transfer position, the transfer bias being controlled by the transfer current. The transfer unit 28 transfers the toner image on the intermediate transfer belt 27 to the paper P by the transfer bias. The system control unit 5 controls the transfer current that is used in the secondary transfer processing.

A fixing unit 29 arranged at the downstream side of the transfer unit 28 has a function of fixing the transferred toner image on the paper P. For example, in the embodiment, the fixing unit 29 fixes the toner image on the paper P by applying heat and pressure to the paper P.

Figure 5:
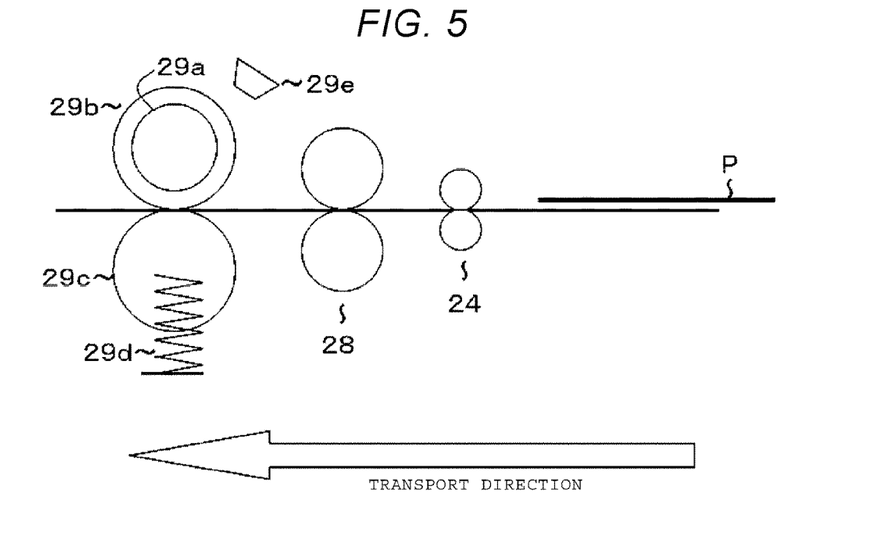
FIG. 5 is a diagram schematically illustrating the relationship between registration rollers, a fixing unit, and a transfer unit.

In the example illustrated in FIG. 1 and FIG. 5, the fixing unit 29 includes a heat roller (heating portion) 29*b* with a heat source 29*a*, and a pressure roller (pressure portion) 29*c* that is brought into contact with the paper P when pressed by a pressure mechanism 29*d*. The heat source 29*a* may be a heater that can control the temperature thereof. For example, the heat source 29*a* may be configured with a lamp heater such as a halogen lamp, and may be an induction heating (IH) type heater. The heat source 29*a* may be configured with a plurality of heaters. The fixing unit 29 further includes a temperature sensor 29*e* that measures the temperature of the heat roller 29*b*. The temperature sensor 29*e* transmits the temperature of the heat roller 29*b* to the system control unit 5 to be described later. The system control unit 5 controls the temperature of the heat roller 29*b* by controlling the heat source 29*a* based on the temperature transmitted from the temperature sensor 29*e*. The pressure mechanism 29*d* presses the pressure roller 29*c* to the heat roller 29*b*. The pressure mechanism 29*d* is configured with an elastic member. When the pressure roller 29*c* is not pressed to the heat roller 29*b* by the pressure mechanism 29*d*, the pressure roller 29*c* and the heat roller 29*b* are separated from each other, and a gap is formed between the pressure roller 29*c* and the heat roller 29*b*. The heat roller 29*b* is rotatably driven by a drive unit 29*f*. The pressure roller 29*c* is driven by the heat roller 29*b* when pressed to the heat roller 29*b*, and is rotatably driven. As illustrated in FIG. 5, the registration rollers 24, the transfer unit 28, and the fixing unit 29 are provided in this order toward the downstream side in the transport direction.

In the fixing processing of fixing the toner image on the paper P, the paper P stored in the paper supply cassette 20A is picked up to the transport path by the pick-up roller 21A, and the paper P is transported to the transfer unit 28. The image is transferred to the paper P by the transfer unit 28 as described above. The fixing unit 29 presses and heats the paper P to which the toner image is transferred at a predetermined fixing temperature by the heat roller 29*b* and the pressure roller 29*c* having the fixing temperature. Accordingly, the fixing unit 29 fixes the toner image on the paper P.

When the fixing processing is completed, the paper P that is subjected to the fixing processing is transported to any one of the paper discharge unit 30 or an automatic duplex unit (ADU) 31 according to the processing need of the user, by a branching mechanism (not illustrated) positioned at the downstream side of the fixing unit 29. When the paper P that is subjected to the fixing processing by the fixing unit 29 is discharged, the paper P is delivered to the paper discharge unit 30. When an image is formed on the back surface of the paper P that is subjected to the fixing processing by the fixing unit 29, the paper P is once transported to the paper discharge unit 30, and transported to the ADU 31 in a switch-back manner. In this case, the ADU 31 supplies the paper P that is reversed by the switch-back to the upstream side of the registration rollers 24, as illustrated in FIG. 1.

Figure 6:
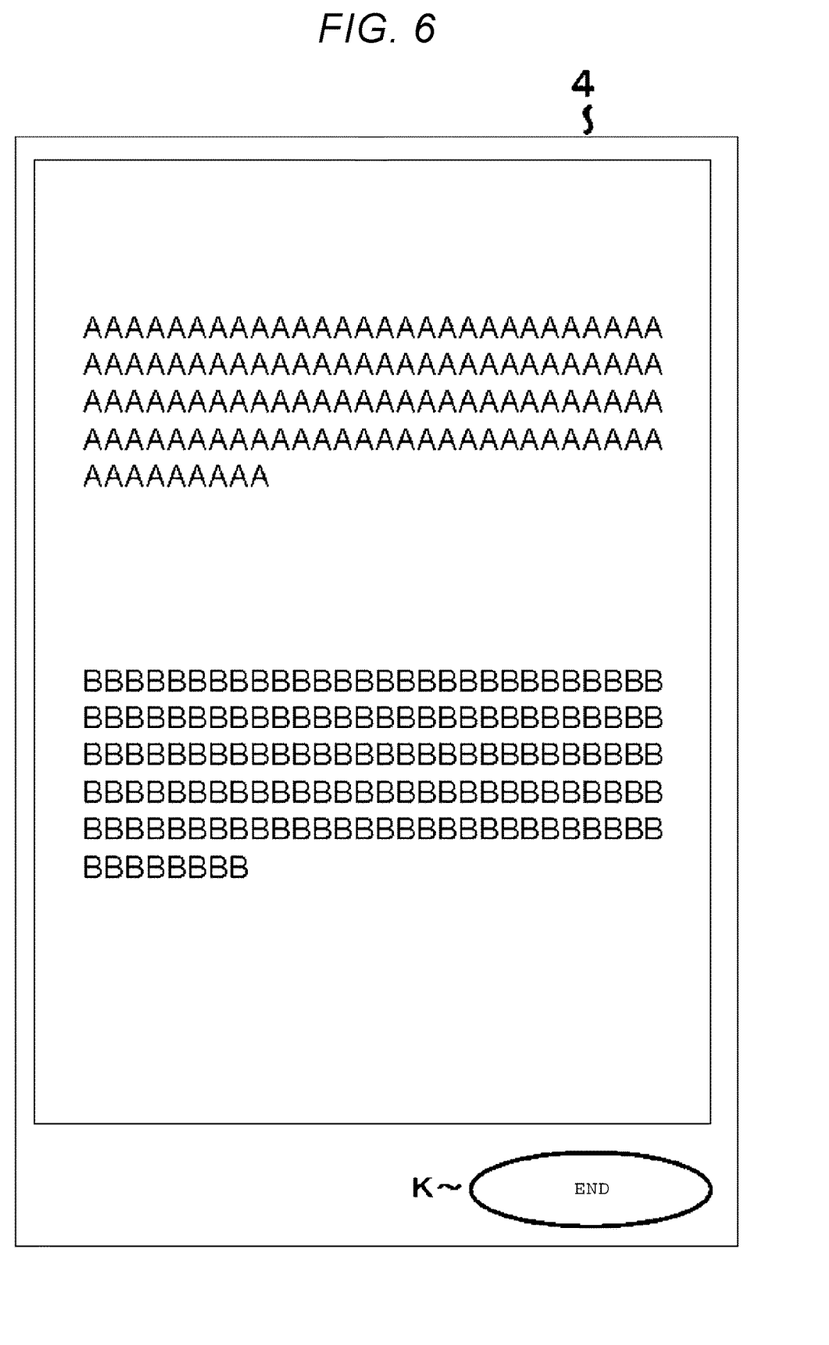
FIG. 6 is a diagram of a screen illustrating an example display of the original document on an operation panel.
Figure 7:
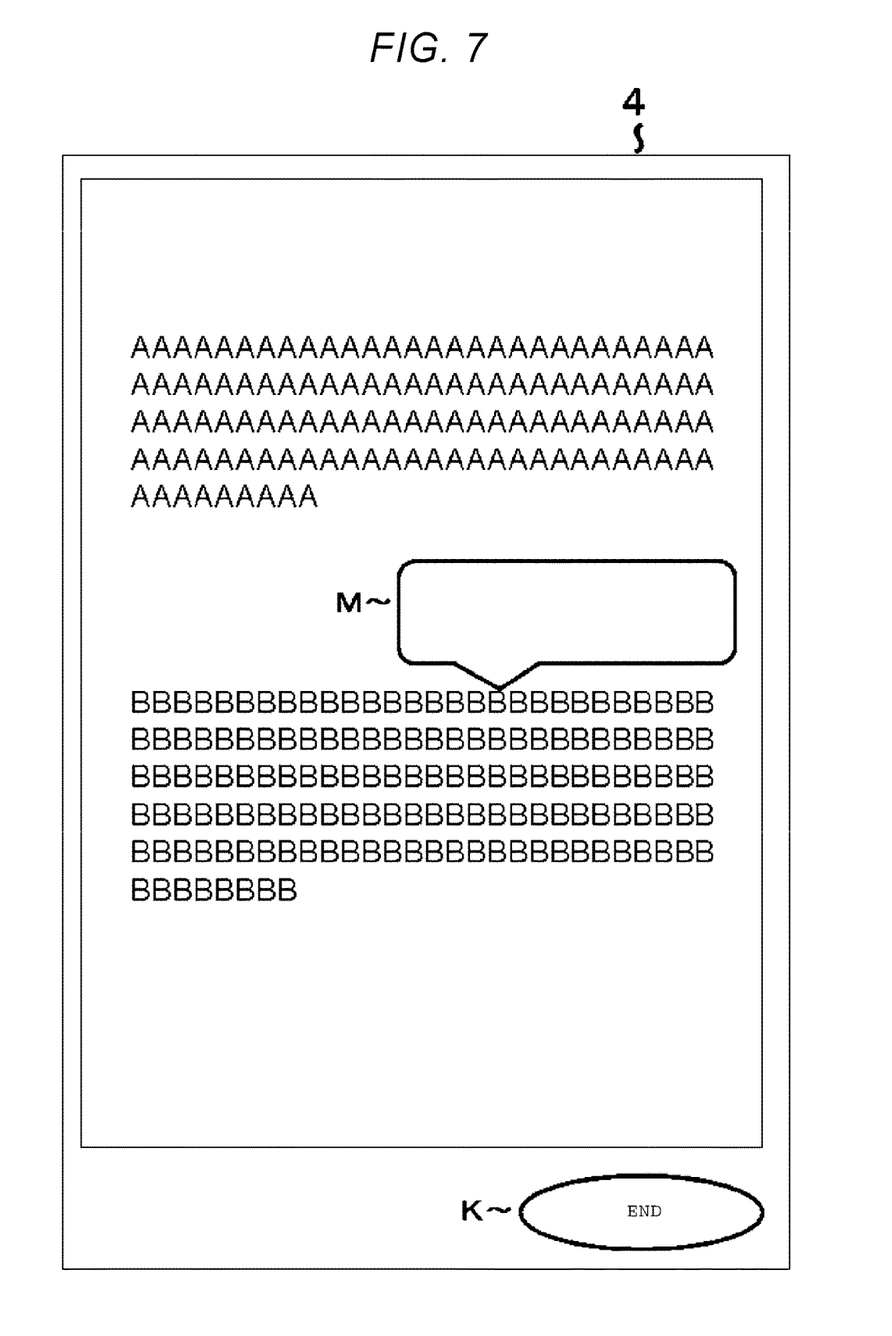
FIG. 7 is a diagram illustrating an example display of a screen on which a memo region is inserted in the original document paper.
Figure 8:
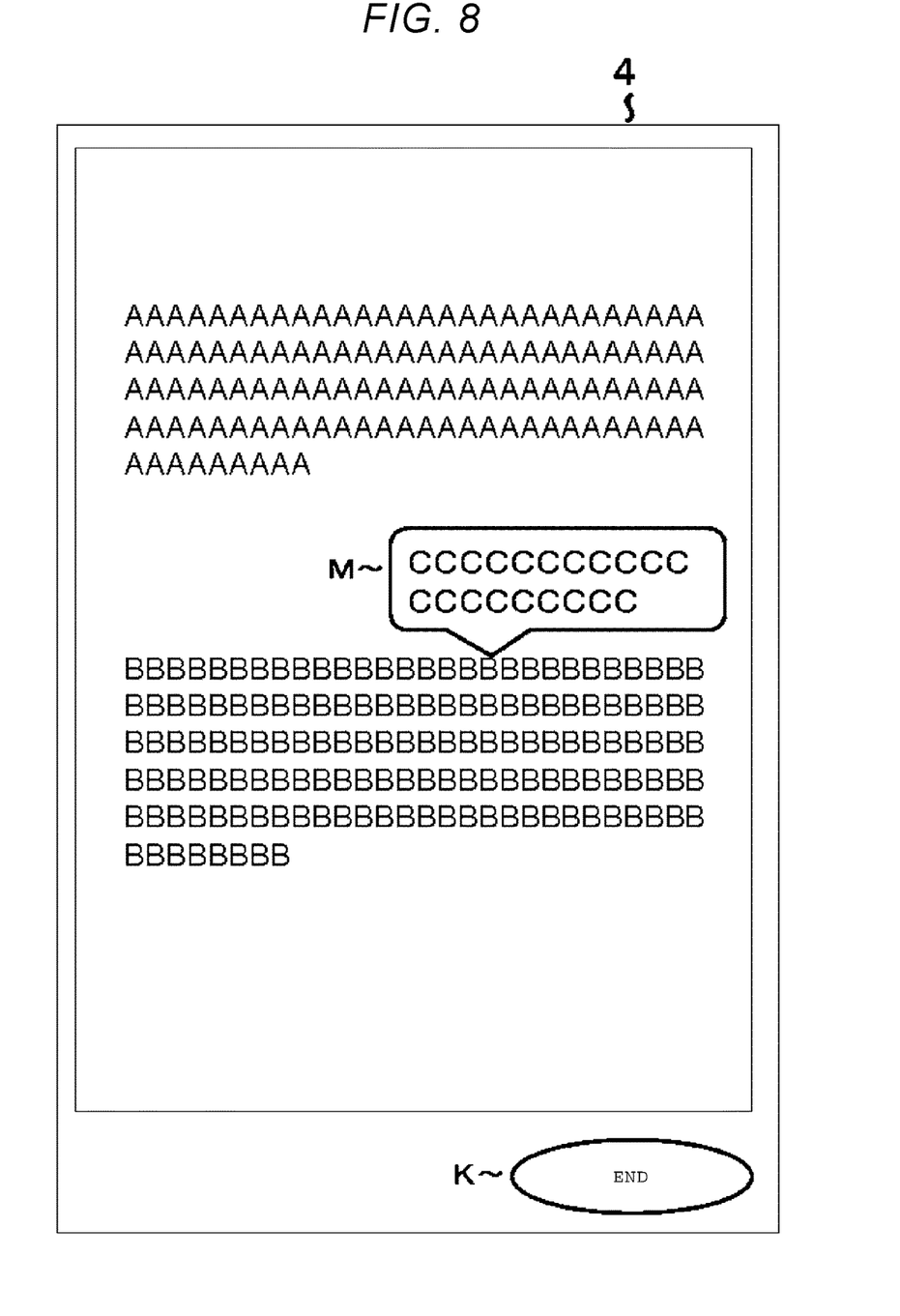
FIG. 8 is a diagram illustrating an example display of a screen on which the memo region is inserted in the original document paper.

The operation panel 4 is a user interface. The operation panel 4 is typically positioned on the upper front side of the main body of the MFP 100, and includes input buttons of various hard keys such as a start button key and a display unit 4*a* including a touch panel 4*b*. The system control unit 5 controls the content to be displayed on the display unit 4*a* of the operation panel 4. Various software keys are also displayed on the operation panel 4, and various types of operation information can be input by touching the displayed software keys. For example, when the operator copies the original document paper G placed on the scanner unit 1, the operator selects any one mode of a normal copy mode, a memo region insertion copy mode (first mode), and a memo region only copy mode (second mode) by operating the operation panel 4. These three modes are displayed on the display unit 4*a* as software keys. When the operator completes various operations, as illustrated in FIGS. 6 to 8, the operator presses an end key K displayed on the bottom of the operation panel 4. The operation panel 4 outputs the information that is input by the touch panel 4*b* of the display unit 4*a* or the input button, to the system control unit 5.

In the following, each mode will be described. Since the normal copy mode is a mode for copying the paper P placed on the scanner unit 1, the description thereof is omitted. The memo region insertion copy mode is a mode for printing the paper to be copied by inserting a memo region when copying. The memo region only copy mode is a mode for printing the memo region on the copy source original document.

The memo region insertion copy mode is a mode for copying the paper P, as illustrated in FIGS. 6 to 8, and inserting a memo region M, when copying the paper P placed on the scanner unit 1. First, the operator selects the memo region insertion copy mode by operating the touch panel 4*b*. The system control unit 5 reads the paper P placed on the scanner unit 1 by color reading. When the memo region insertion copy mode is selected, the original document is once read in color and the color of the paper is determined, regardless of whether the operator selects a color copy or a monochrome copy. After determining the color of the paper, when the monochrome copy is selected by the operator, the image information that is read is converted to a monochrome image. As illustrated in FIG. 6, the image of the paper P that is read is displayed on the operation panel 4. The operator visually recognizes the displayed paper P, and inputs the coordinates where a memo region M is to be inserted (refer to FIG. 7) by operating the touch panel 4*b*. The coordinates where the memo region M is to be inserted is designated by inputting the two points of the start point and the end point, and thus the square-shaped memo region M is formed on the screen. When the memo region M is inserted, the screen as illustrated in FIG. 7 is displayed on the operation panel 4. After displaying, an end key K is pressed by the operator. Then, the image in which a text box is inserted into the paper P is formed and printed by the printer unit 2. At this time, it is confirmed whether the color of the paper P is colored or white. When the color of the paper P is colored, the background of the memo region M is formed with white toner, and when the color of the paper P is white, the memo region M is created with black toner. In this case, an image is not formed within the frame of the memo region M.

The memo region only copy mode is a mode for printing the memo region M without printing the image of the paper P. In other words, this mode is used for printing the memo region M onto the original document paper G placed on the scanner unit 1. That is, the operator selects the memo region only copy mode by operating the software key of the operation panel 4. Then, the system control unit 5 reads the paper P placed on the scanner unit 1 by color reading. Even in the memo region only copy mode, similar to the memo region insertion copy mode, the original document is once read in color and the color of the paper is determined, regardless of whether the operator selects a color copy or a monochrome copy. After determining the color of the paper, when the monochrome copy is selected by the operator, the image information that is read is converted to a monochrome image. Then, as illustrated in FIG. 6, the image of the paper P that is read is displayed on the display unit 4a. The operator visually recognizes the displayed paper P, and inputs the coordinates where a memo region M is to be inserted by operating the touch panel 4b. When the memo region M is inserted, the screen as illustrated in FIG. 7 is displayed on the operation panel 4. After the input of the memo region M is completed, the operator removes the paper P from the scanner unit 1, sets the paper P in any paper supply cassette of the paper supply unit 20, and then presses the start button. Then, the memo region M is printed on the paper P. Similar to the memo region insertion copy mode, it is confirmed whether the color of the paper P is colored or white. When the color of the paper P is colored, the background of the memo region M is formed with white toner, and when the color of the paper P is white, the memo region M is created with black toner. In this case, an image is not formed within the frame of the memo region M.

When the memo region insertion copy mode or the memo region only copy mode is selected, after the memo region M is formed on the screen of the operation panel 4, a handwritten input may be input in the memo region M using a technique that allows character input by touching the operation panel 4 using a touch pen or the like.

Figure 2:
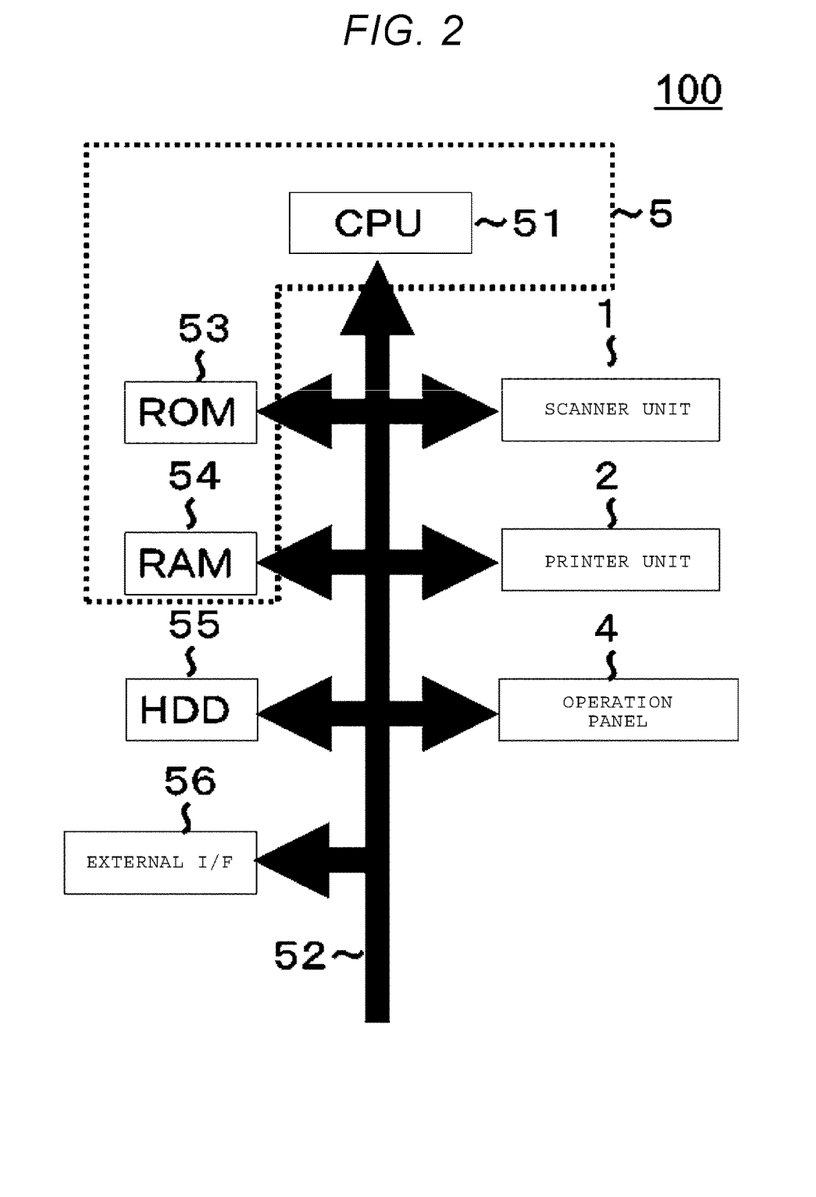
FIG. 2 is a block diagram of the image forming apparatus.

Next, the configuration of the control system of the MFP 100 will be described. FIG. 2 is a block diagram of the MFP 100 according to the present embodiment. A central processing unit (CPU) 51, a read only memory (ROM) 53, a random access memory (RAM) 54, a hard disk drive (HDD) 55, an external interface (I/F) 56, the printer unit 2, and the operation panel 4 are connected to each other via a system bus 52. The system control unit 5 includes the CPU 51, the ROM 53, and the RAM 54.

Programs to be executed by the CPU 51, threshold values, and the like are stored in advance in the ROM 53.

Figure 10:
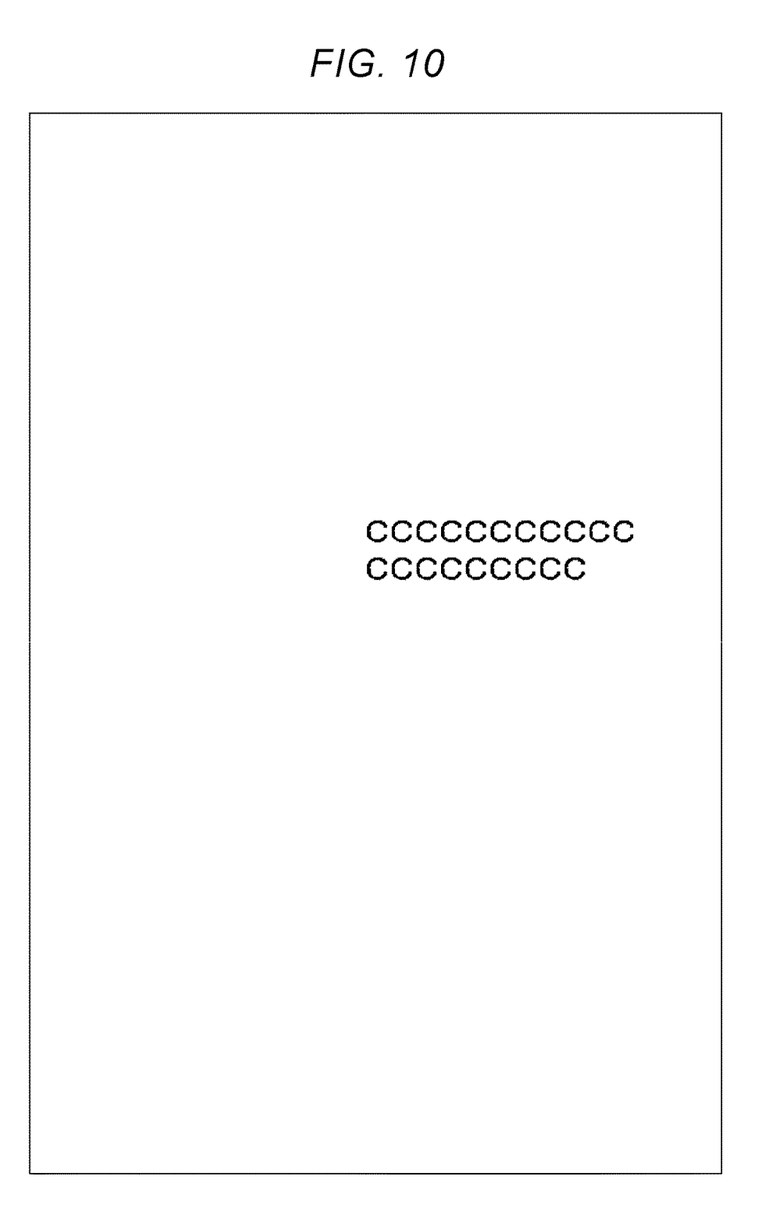
FIG. 10 is a diagram illustrating image information that is stored in a second image storage area.

In the RAM 54, various memory areas such as an area for developing a program executed by the CPU 51, a working area for data processing by a program, or the like are dynamically formed. The RAM 54 includes a first image storage area for storing the image information to be printed. An image is formed based on the image information stored in the first image storage area, and the image is primarily transferred to the intermediate transfer belt 27. The image information stored in the first image storage area is received from the outside via the external I/F 56, or the image of the paper P is captured and stored through the scanner unit 1. The image of the memo region that is inserted by the operator is also received and stored in the first image storage area, in addition to the image information. The RAM 54 further includes a second image storage area. As illustrated in FIG. 10, the second image storage area stores the image to be formed in the memo region. When the image information stored in the first image storage area is printed on a surface the paper, the image information stored in the second image storage area is also printed on the same surface of the paper.

Figure 4:
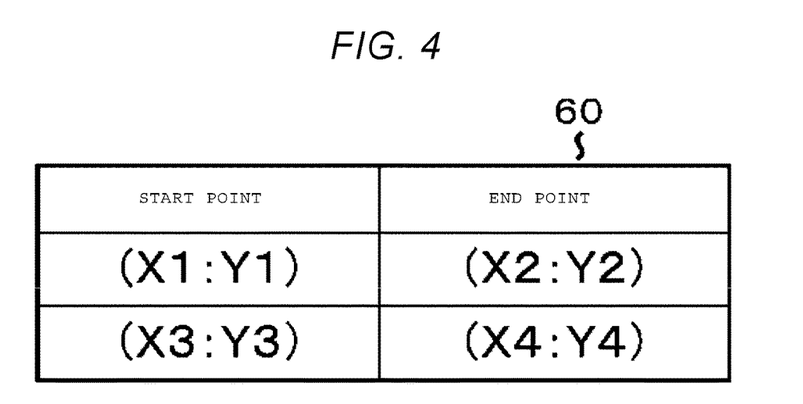
FIG. 4 illustrates an example coordinate file.

The RAM 54 includes a coordinate file 60 which stores the coordinates where the memo region M is to be inserted. The coordinates are input from the operation panel 4 when the memo region insertion copy mode or the memo region only copy mode is selected. As illustrated in FIG. 4, the coordinate file includes a start point area and an end point area corresponding to the start point area. When the coordinates of the memo region M are input, the X coordinate and the Y coordinate that are input by the operator are input as the start point area. After the coordinates of the start point area are input, the X coordinate value and the Y coordinate value that are sequentially input are input as the end point area. The system control unit 5 corrects the image information of the first image storage area based on the values of the coordinate file 60.

The RAM 54 includes a flag area. The flag area stores each flag for managing the normal copy mode, the memo region only copy mode, and the memo region insertion copy mode. The system control unit 5 controls the MFP 100 based on the flags stored in the flag area. In the present embodiment, for example, the normal copy mode is set to "00", the memo region only copy mode is set to "01", and the memo region insertion copy mode is set to "11", in the flag area. It is assumed that a value of "00" is set in the flag area by default.

The RAM 54 further includes a paper color area. The paper color area is an area that stores flags for managing whether the color of the paper P is white or colored. In the present embodiment, for example, "00" is stored in the case of white color, and "01" is stored in the case of color. It is assumed that a value of "00" is stored in the paper color area by default.

An operating system (OS) for operating the MFP 100 is installed in the HDD 55. As described above, the type of paper stored in each of the paper supply cassettes 20A, 20B, and 20C is stored in the predetermined area of the HDD 55.

Returning to FIG. 2, the external I/F 56 is an interface for communicating with an external device, for example, such as a client terminal (PC). The external I/F 56 receives the print data in accordance with the print request from the external device. The external I/F 56 may be an interface that performs data communication with an external device. For example, the external I/F 56 may be a device (USB memory or the like) that is locally connected to an external device, or may be a network interface for communicating via network (the external I/F 56 may serve as an input unit).

A transport unit is configured with a plurality of motors and rollers for transporting the paper P, such as each transport roller, the registration rollers 24, and the drive unit 29f in the MFP 100. The motors are controlled by the system control unit 5, and the rotation speed of each roller such as the heat roller 29b or the registration rollers 24 is changed by the system control unit 5. Each roller can be individually stopped or driven, and the rotation speed (transport speed) or the like of each motor can be changed as required.

Since the configurations of the scanner unit 1, the printer unit 2, and operation panel 4 are described above, the description thereof is omitted.

Figure 11:
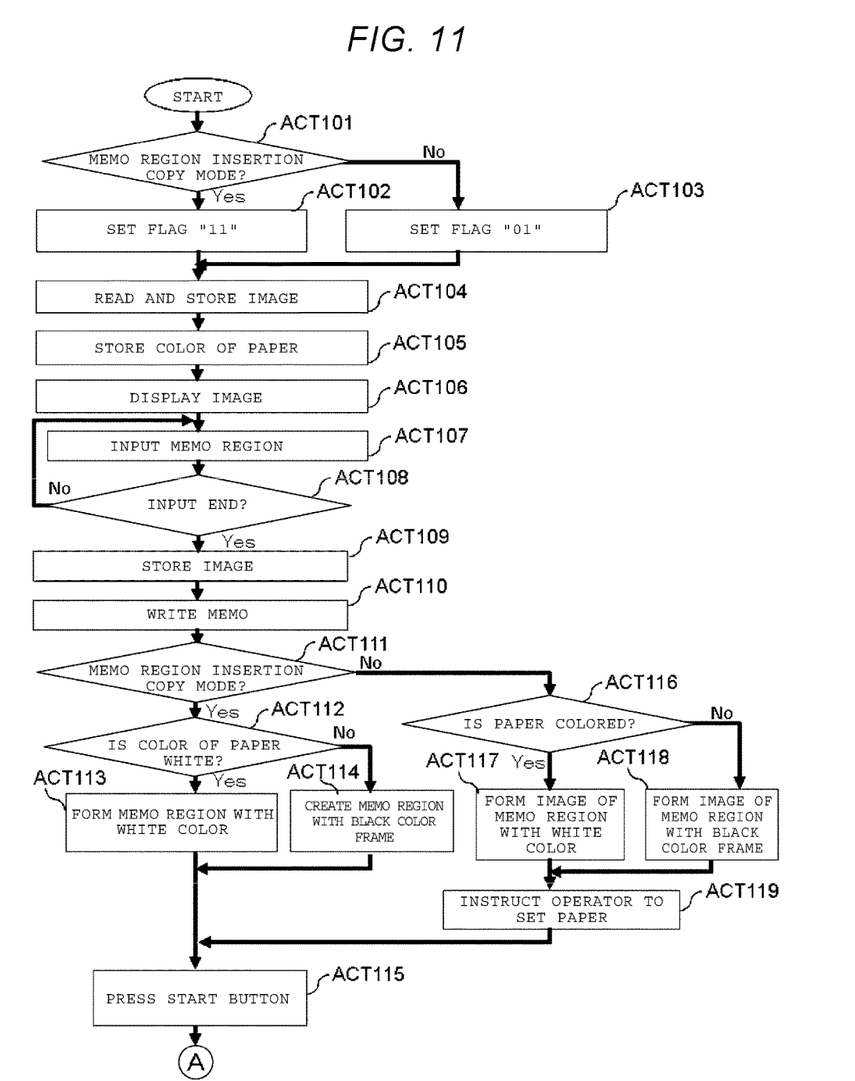
FIGS. 11 and 12 are flow charts illustrating an example sequence of operation for performing a copy job of the image forming apparatus.
Figure 12:
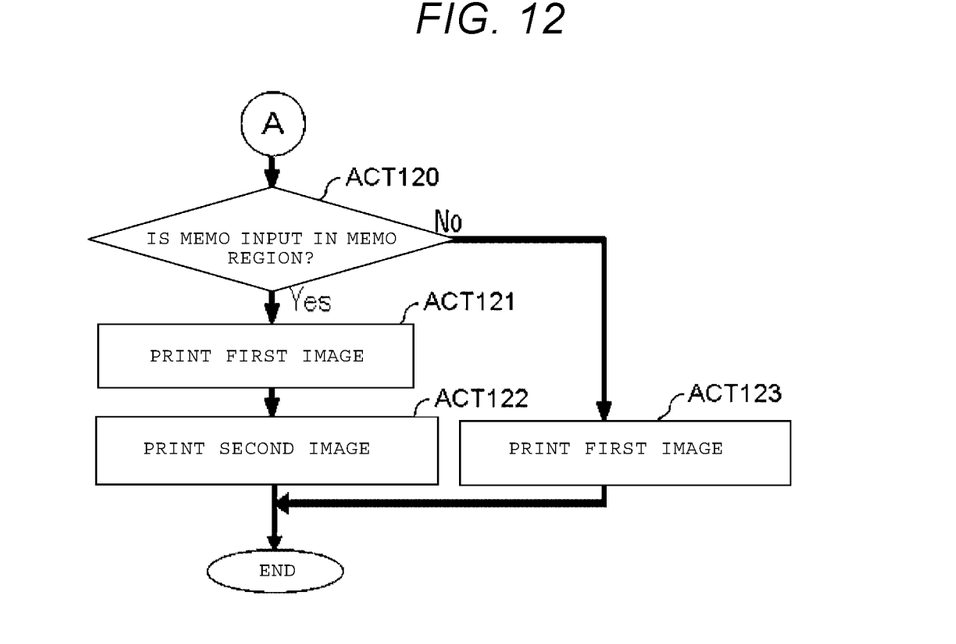

The MFP 100 executes the copy job illustrated in FIGS. 11 and 12, based on the program that is set in advance in the MFP 100 with the configuration.

It is assumed that the paper P as illustrated in FIG. 3 is placed on the scanner unit 1. The paper P has a color (for example, a pale yellow). Further, it is assumed that paper having the same color as that of the paper P is placed on the paper supply cassette 20A. A case where the operator selects color copy and selects the memo region insertion copy mode or the memo region only copy mode by operating the operation panel 4 will be described as an example. Further, it is assumed that, after the coordinates of the memo region M are input, the operator inputs the contents (for example, "CC . . . " shown in FIG. 8) of the memo region M by using a touch pen or the like.

In the flowchart illustrated in FIG. 11, the system control unit 5 detects whether the memo region insertion copy mode or the memo region only copy mode is selected, based on the signal of the software keyboard on the operation panel 4 (ACT101).

For example, when it is determined that the memo region insertion copy mode is selected (Yes in ACT101), the system control unit 5 stores "11" in the flag area of the RAM 54 (ACT102). On the other hand, when it is determined that the memo region only copy mode is selected (No in ACT101), the system control unit 5 stores "01" in the flag area of the RAM 54 (ACT103).

Sequentially, the system control unit 5 activates the scanner unit 1 and reads the paper P by color reading. The image information that is generated is stored in the first image storage area of the RAM 54 (ACT104).

Sequentially, the system control unit 5 determines whether the color of the paper P that is read is white or color. In the determination, the color of the paper P is determined by analyzing the image information stored in the first image storage area of the RAM 54 using an analysis method such as macro recognition or micro recognition. When the color of the paper P is white, "00" is stored in the paper color area of the RAM 54, and when the color of the paper P is not white, "01" is stored in the paper color area of the RAM 54. In the present embodiment, since the paper P is colored, "01" is stored in the paper color area (ACT105). When color copy is selected, the image information is not converted into a monochrome image. When the operator selects monochrome copy, the image information is converted from the color image into a monochrome image.

The system control unit 5 displays the paper P stored in the first image storage area of the RAM 54, on the operation panel 4, as illustrated in FIG. 6 (ACT106).

The system control unit 5 receives the input of the coordinate information of the memo region M when the touch panel 4b is touched. When the coordinate information is input, as illustrated in FIG. 7, the memo region M is displayed on the image of paper P displayed on the operation panel 4. The coordinate information of the start point and the end point corresponding to the start point is stored in the coordinate file 60 of the RAM 54 (ACT107).

Sequentially, the system control unit 5 determines whether or not the end key K of the touch panel 4b is pressed (ACT108). When the end key K is not pressed (No in ACT108), the system control unit 5 returns to ACT107 and continues to receive the input of the coordinate information.

On the other hand, when it is determined that the end key K of the touch panel 4b is pressed (Yes in ACT108), the system control unit 5 corrects the first image storage area of the RAM 54 based on the data of the coordinate file 60. In the present embodiment, the image of the paper P as displayed on the screen of the operation panel 4 illustrated in FIG. 7 is stored in the first image storage area (ACT109).

After the image is stored in the first image storage area by ACT109, the system control unit 5 receives a handwritten input in the displayed memo region M. When the operator does not want to write in the memo region M, the key signal of the end key K is input to the system control unit 5, subsequent to Yes in ACT108. In the present embodiment, as illustrated in FIG. 8, it is assumed that the operator inputs "CC . . . " using a touch pen or the like. When the input in the memo region M is completed, as illustrated in FIG. 10, the image information that is input in the memo region is stored in the second image storage area of the RAM 54. In other words, in the present embodiment, the image information as displayed on the screen of the operation panel 4 illustrated in FIG. 7 is stored in the first image storage area, and the image information as illustrated in FIG. 10 is stored in the second image storage area. The system control unit 5 detects that the end key K at the bottom of the screen is pressed (ACT110).

When the end key K is pressed in ACT110, the system control unit 5 checks whether "11" is stored in the flag area of the RAM 54, that is, whether the memo region insertion copy mode is selected (ACT111).

When it is determined that "11" is stored in the flag area of the RAM 54 (Yes in ACT111), the system control unit 5 sequentially checks the flag recorded in the paper color area of the RAM 54. In other words, the system control unit 5 checks the color of the paper (ACT112).

When it is determined that "01" is stored in the paper color area of the RAM 54 (Yes in ACT112), the system control unit 5 corrects the image information stored in the first image storage area of the RAM 54 by referring to the value of the coordinate file 60 of the RAM 54, so as to form the memo region of the image information stored in the first image storage area of the RAM 54 with white toner (ACT113).

On the other hand, when it is determined that "00" is stored in the paper color area, that is, when it is determined that the color of the paper P is white (No in ACT112), the system control unit 5 corrects the image information stored in the first image storage area of the RAM 54 by referring to the value of the coordinate file 60 of the RAM 54 so as to form only the frame line of the memo region M of the image information with black toner and not to form an image with toner within the frame of the memo region M (ACT114).

The system control unit 5 confirms that the start button key is pressed (ACT115).

On the other hand, in ACT111, when it is determined that "01" is stored in the flag area of the RAM 54 (No in ACT111), that is, when the memo region only copy mode is selected, the system control unit 5 checks the flag recorded in the paper color area of the RAM 54. In other words, the system control unit 5 checks the color of the paper (ACT116).

Figure 9:
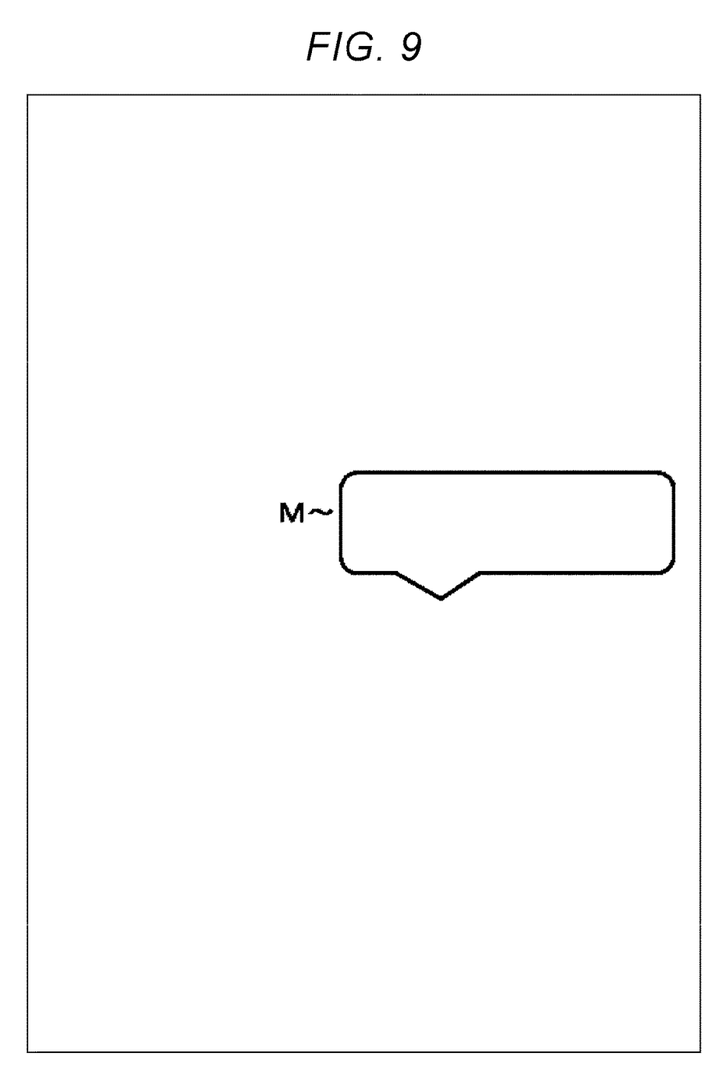
FIG. 9 is a diagram illustrating image information that is stored in a first image storage area when a memo region only copy mode is selected.

When it is determined that "01" is stored in the paper color area of the RAM 54 (Yes in ACT116), as illustrated in FIG. 9, the system control unit 5 deletes the image information while leaving the memo region M of the image information of the first image storage area of the RAM 54, by referring to the value of the coordinate file 60 of the RAM 54. The memo region M is created with white toner (ACT117).

On the other hand, when it is determined that "00" is stored in the paper color area, that is, when it is determined that the color of the paper P is white (No in ACT116), as illustrated in FIG. 9, the system control unit 5 deletes the image information while leaving the memo region M of the image information of the first image storage area of the RAM 54, by referring to the value of the coordinate file 60 of the RAM 54. The system control unit 5 creates the image information of only the memo region M in the first image storage area of the RAM 54. At this time, only the frame line with black toner is added in the memo region M, and the image is not formed with toner within the frame of the memo region M (ACT118).

The system control unit 5 instructs the operator to set the paper using the operation panel 4 (ACT119). The paper P placed on the scanner unit 1 is placed on the paper supply unit 20 by the operator in response to the instruction. After the mounting is completed, the operator presses the start button key (ACT115).

In ACT115, when it is confirmed that the start button key is pressed, as illustrated in FIG. 12, the system control unit 5 determines whether or not an image is stored in the second image storage area of the RAM 54 (ACT120).

When the system control unit 5 determines that an image is stored in the second image storage area of the RAM 54 (Yes in ACT120), the paper is supplied from the paper supply cassette 20A of the paper supply unit 20. Then, the image information stored in the first storage area of the RAM 54 is formed on the paper P using the image forming units 25. After the image information is formed on the paper P, the image fixed on the paper using the fixing unit 29 (ACT121).

Sequentially, the image information stored in the second image storage area of the RAM 54 is printed on the paper. After the image information stored in the first storage area of the RAM 54 is printed, the paper is transported again to the image forming units 25 and the transfer unit 28 without reversing the paper by using the ADU 31. The image information stored in the second image storage area of the RAM 54 is transferred to the paper P by using the image forming units 25, and the transferred image is fixed by using the fixing unit 29. Thus, the second image is printed (ACT122). Then, the printed paper is discharged to the paper discharge unit 30, and the processing is terminated.

On the other hand, when the system control unit 5 determines that an image is not stored in the second image storage area of the RAM 54 (No in ACT120), the paper is supplied from the paper supply cassette 20A of the paper supply unit 20. Then, the image information stored in the first storage area of the RAM 54 is formed on the paper P using the image forming units 25. After the image information is formed, the image fixed on the paper using the fixing unit 29 (ACT123). Then, the printed paper is discharged to the paper discharge unit 30, and the processing is terminated.

As described above, when the paper has a color, the image of the memo region is formed with a color that is different from the color of the paper, for example, white toner. Accordingly, it is possible to form a memo region that can be easily used by the operator, regardless of the color of the paper. Further, it is also possible to select a mode for printing only the memo region, and thus it is also possible to flexibly correspond to a case where the memo region is added to original paper having a color.

While certain embodiment has been described, the embodiment has been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An image forming apparatus comprising:
    a printer configured to form an image on a sheet supplied from a sheet supply unit;
    a scanner configured to read an original document and generate a corresponding original image;
    a memory configured to store the original image of the original document;
    a user interface including a display and configured to:
        receive an input from a user indicating a position of a memo region to be formed in the original image,
        receive a mode selection of one of a first mode and a second mode; and
    a controller configured to:
        control the printer to form, on a sheet supplied from the sheet supply unit, the original image and a memo image in the position of the memo region indicated by the received input, so that
            the printer forms, on the sheet supplied from the sheet supply unit, the original image and the memo image in the position of the memo region indicated by the received input, if the received mode selection is the first mode,
        and
            the printer forms, on a sheet supplied from the sheet supply unit, the memo image in the position of the memo region indicated by the received input without forming the original image, if the received mode selection is the second mode, and
        control the display to display guidance for the user to move the original document from the scanner to the sheet supply unit after the scanner reads the original document, if the received mode selection is the second mode, and
    wherein the controller is further configured to control the printer to form at least a portion of the original image in an area of the sheet other than the memo region without forming any of the original image inside the memo region.

2. The apparatus according to claim 1, wherein the controller is further configured to: generate the memo image to be formed in the position of the memo region indicated by the received input.

3. The apparatus according to claim 1, wherein the controller is further configured to control the printer to: form, on the sheet, an outline of the memo image in the position of the memo region with a recording material, and form the original image on the sheet in the area of the sheet other than the memo region without forming any of the original image inside the outline of the memo region.

4. The apparatus according to claim 3, wherein the user interface is further configured to receive a message which is to be formed inside the memo field, and the controller is further configured to control the printer to: form the original image on the sheet without using any recording material inside the outline of the memo field, and form the message on the sheet with the recording material inside the memo field if the message is received by the user interface.

5. The apparatus according to claim 4, wherein the controller is further configured to control the printer to form the message on the sheet after forming the memo image on the sheet.

6. The apparatus according to claim 1, wherein the position indicated by the input from the user is coordinate data including a start point and an end point.

7. The apparatus according to claim 1, wherein the controller is further configured to control the display to display the original image of the original document, and the user interface receives the input of the position while the original image is displayed.

8. The apparatus according to claim 1, wherein the controller is further configured to determine a color of the original document based on the generated original image, and when the color of the original document is determined to be colored, the memo image is formed on the sheet with a white recording material.

9. An image forming method comprising the steps of:
    reading an original document and generating an original image corresponding to the original document;

receiving, via a user interface including a display, an input from a user indicating a position of a memo region to be formed in the original image;

receiving, via the user interface, a mode selection of one of a first mode and a second mode;

forming, on a sheet supplied from a sheet supply unit, the original image and a memo image in the position of the memo region indicated by the received input, wherein:

the original image and the memo image are formed on a sheet supplied from the sheet supply unit when the received mode selection is the first mode, and the memo image, but not the original image, are formed on a sheet supplied from the sheet supply unit when the received mode selection is the second mode, and when the received mode selection is the second mode, controlling the display to display guidance for the user to move the original document from a scanner that reads the original document to the sheet supply unit after the scanner reads the original document, and wherein the original image is formed in an area of the sheet other than the memo region without forming any of the original image inside the memo region.

10. The method according to claim 9, further comprising the step of: determining a color of the original document based on the generated original image, wherein when the color of the original document is determined to be colored, the memo image is formed on the sheet with a white recording material.

11. The method according to claim 9, wherein forming the original image and the memo image on the sheet includes: forming, on the sheet, an outline of the memo image in the position of the memo region with a recording material, and forming at least a portion of the original image on the sheet in the area of the sheet other than the memo region without forming any of the original image inside the outline of the memo region.

12. The method according to claim 11, further comprising the step of receiving a message which is to be formed inside the memo image in the position of the memo region, wherein forming the original image and the memo image further includes: forming the original image on the sheet without using any recording material inside the outline of the memo region, and forming the message on the sheet with the recording material inside the memo region.

13. The method according to claim 12, wherein the message is formed on the sheet after the memo image is formed on the sheet.

14. The method according to claim 9, further comprising the step of: controlling the display to display the original image of the original document, wherein the user interface receives input of the position while the original image is displayed.

* * * * *